Aug. 19, 1958 — L. W. FROMM, JR — 2,848,266
REMOTE RETRIEVING TOOL
Filed Jan. 13, 1956 — 2 Sheets-Sheet 1
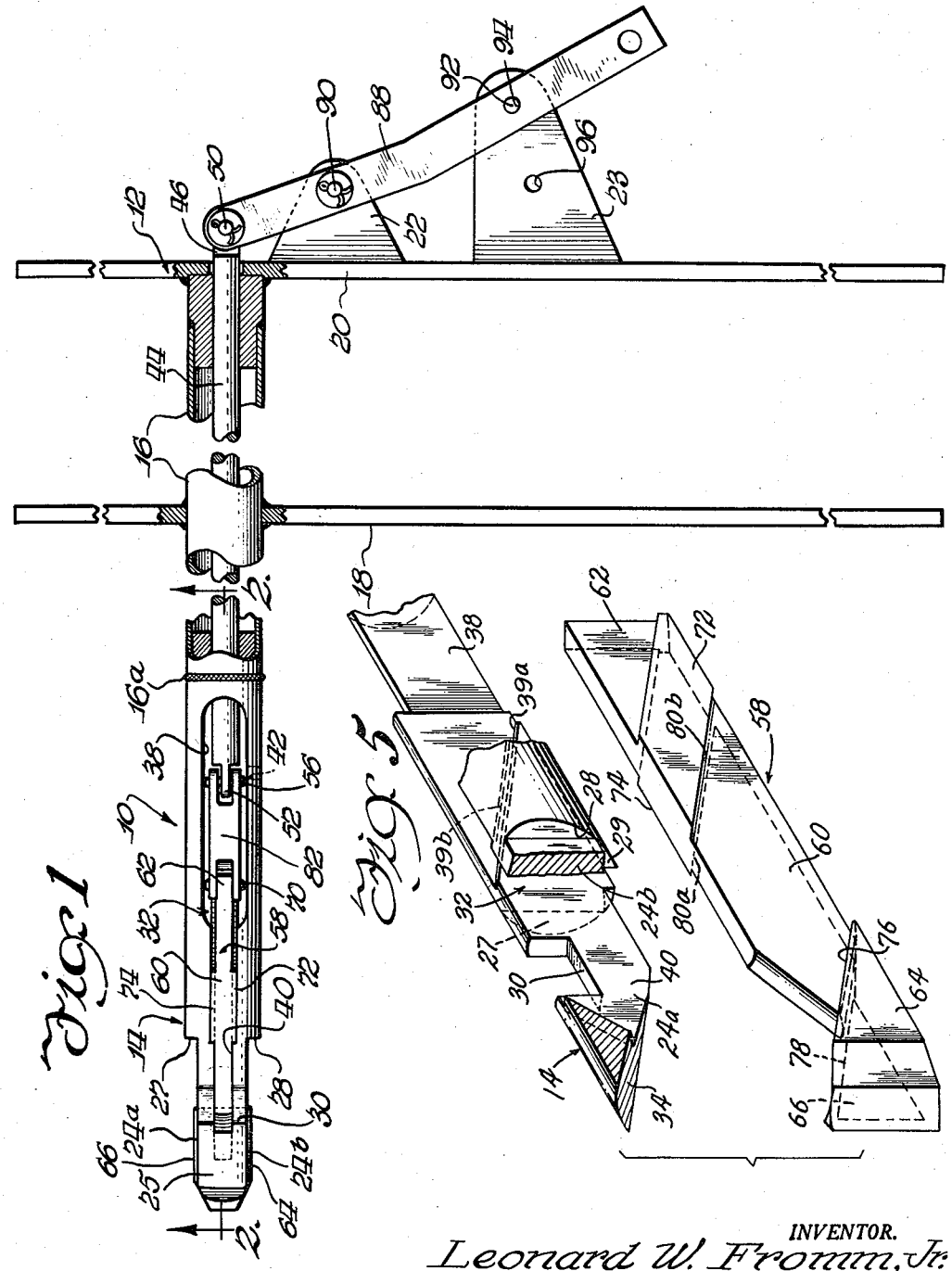
INVENTOR.
Leonard W. Fromm, Jr.
BY
Roland A. Anderson
Attorney

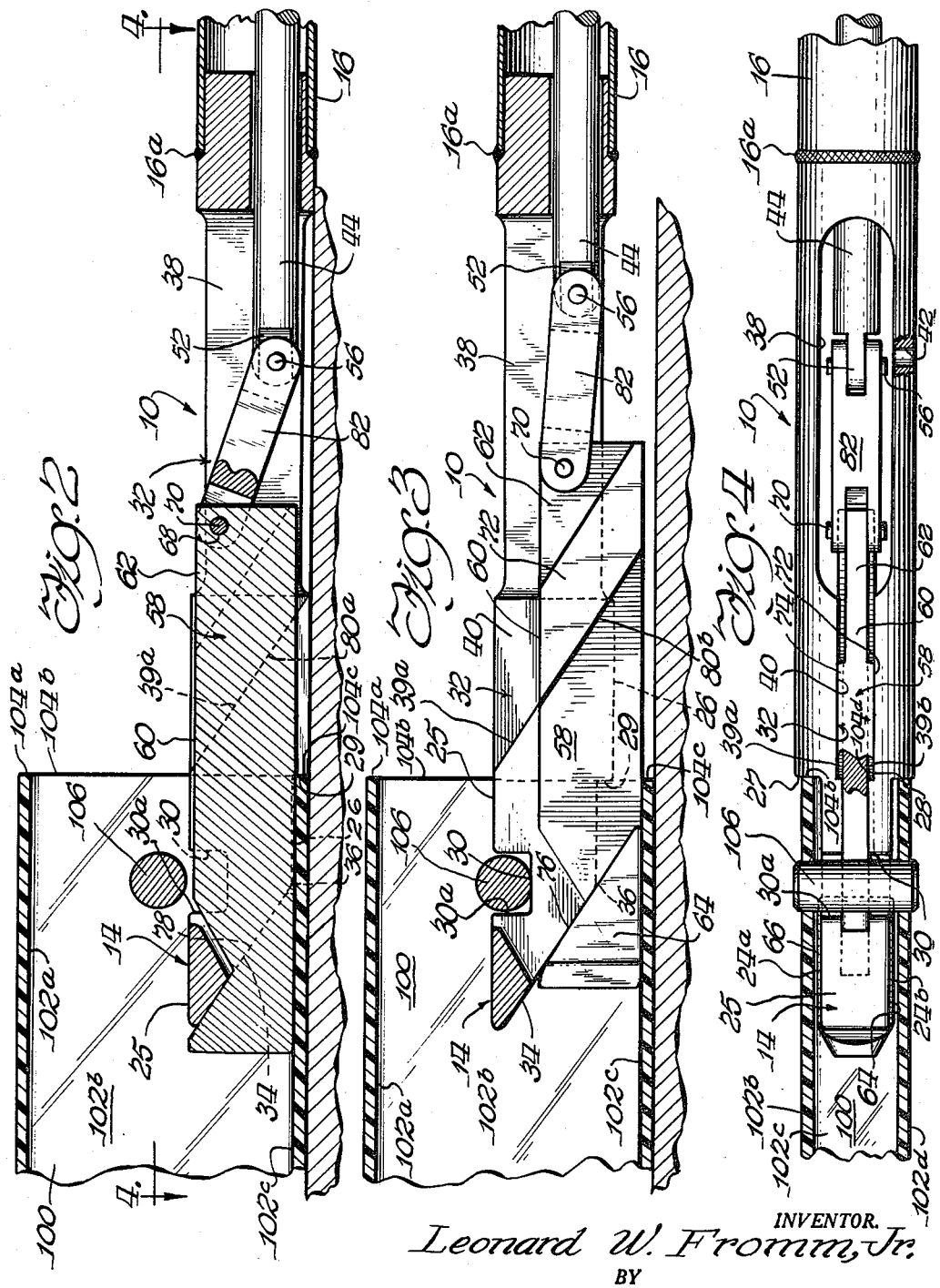

United States Patent Office 2,848,266
Patented Aug. 19, 1958

2,848,266

REMOTE RETRIEVING TOOL

Leonard W. Fromm, Jr., Glen Ellyn, Ill., assignor to the United States of America as represented by the United States Atomic Energy Commission Application January 13, 1956, Serial No. 559,083

5 Claims. (Cl. 294—19)

The present invention relates to a mechanical apparatus, and in particular relates to a retrieving tool adapted for remotely seizing and moving objects within narrow channels.

Certain industrial and technical processes require that an object be placed in a known position in a narrow channel or tube and later retrieved. Examples of such processes are to be found in arts wherein a substance is placed in an oven or furnace for heating, or in a nuclear reactor for exposure to neutron flux. In the latter example substances to be irradiated within the reactor core are placed in a sample container and slid into a tube which passes through the reactor core. The sample container carrying its material to be irradiated is positioned at a specified distance from the center of the reactor core in order to expose it to a predetermined and known neutron flux. The neutron flux in a nuclear reactor varies in accordance with some known function of the distance from the center of the reactor core. Accordingly, there is need for a retrieving tool adapted for insertion into a tube with which a remote object in the tube can be seized and repositioned within the tube or entirely withdrawn from the tube.

Therefore, one objective of the present invention is to provide a retrieving tool adapted for seizing, moving, and then releasing a remote object.

Another objective of the present invention is to provide a positive grip and positive release retrieving tool adapted to passage of the working end of the retrieving tool through a narrow, elongated tube to contact an object which it is desirable to move.

These and other objects of my invention will be evident from the following drawings, specification, and claims.

My invention is an elongated remote retrieving tool adapted to insertion of a portion thereof through a narrow channel to contact an object wherewith an operator may cause the portion inserted into the channel or working end of the retrieving tool as it is termed below to positively engage the object by manipulation of the portion of the tool not inserted into the channel or the control end of the tool as it is termed below whereby the object may be repositioned by moving the entire retrieving tool, then positively disengage the tool from the object by again manipulating the control end of the tool.

My invention is illustrated in the following drawings in which

Fig. 1 is a plan view partly cut away of one embodiment of my invention;

Fig. 2 is a sectional view of a fragment of the embodiment of my invention shown in Fig. 1, taken along line 2—2;

Fig. 3 is a sectional view partly cut away of the working end of the embodiment of my invention shown in Fig. 1, and differs from Fig. 2 in that the working end of the tool is shown in engagement with an object;

Fig. 4 is a plan view of the working end of the embodiment of my invention shown in Fig. 1; and Fig. 5 is an exploded perspective view of the tool, with portions cut away.

Referring now to the drawings, the main part of the retrieving tool and the structure with respect to which all other parts of the retrieving tool are positioned and moved is an elongated hollow member 10 having a control end 12 and a working end 14. The elongated member 10 is a single unitary structure comprising a hollow tube 16 to which two parallel horizontal metal bars 18 and 20 are rigidly fastened at the control end 12; the bars 18 and 20 are suitable for a man to grasp with his hands. The bar 20 is provided with a fulcrum 22 and a locking bracket 23. The function and details of the fulcrum and locking bracket will be described below.

The working end 14 of the elongated hollow member 10 may be conveniently machined from a section of metal rod which, after machining, is welded to the end 16a of the tube 16. The working end 14 of the elongated hollow member has an upper side 25 and a lower side 26. The sides 24a and 24b and the lower side 26 of the working end 14 are cut away or recessed from the tip end back a distance to form shoulders 27, 28 and 29. A deep lateral recess 30 is cut into the upper side 25 of the working end 14; it is positioned a distance from the tip of the end 14, and constitutes a hook which is readily engaged and disengaged from objects being retrieved by the tool.

An elongated opening 32 is cut in the end 14 extending from the upper side 25 through to the lower side 26 and extending longitudinally from the recess 30 back symmetrically through the working end 14 to a point near where the tube 16 is welded on to the working end 14. The working end 14 is further adapted to permit access between the interior hollow of the tube 16 and the elongated opening 32.

The underside of the working end 14 at the extreme end thereof is cut to form a surface 34 on a plane oblique to the plane of the underside 26. The working end 14 is tapered substantially from the upper side tip end thereof back toward the junction of the working end 14 and the tube 16 to a point 36 below the projected position of the recess 30 on the underside 26. The elongated opening 32 intercepts the oblique plane 34 at a point somewhat forward of the projected position of the recess 30; the contour of the opening 32 is cut away below the upper side 25 and extends from the forward edge 30a of the recess 30 toward the oblique plane 34 at an angle of approximately 30 degrees with respect to the plane of the underside 26.

The opening 32 is bilaterally symmetrical throughout its length but is enlarged laterally in the rear portion 38 most remote from the tip end and adjacent to the tube 16. The contour between the wider rear portion 38 and the narrower forward portion 40 of opening 32 is formed in part by two oblique surfaces 39a, 39b extending from the upper side 25 to the lower side 26 parallel with the plane of the oblique surface 34.

On one side of the working end 14 midway between the upper side and the underside and opposite the enlarged portion 38 of the elongated opening 32 a hole 42 is provided for inserting a pin into the structure to be described below which fits within the elongated opening 32. The hole 42 is necessary in order to provide access to the opening 32 suitable for completing final assembly of the retrieving tool.

A rod 44 having sufficient length to extend throughout the length and protrude beyond either end of the hollow tube 16 of the elongated hollow member 10 is positioned free to move axially within the tube 16. A first end of the rod extends beyond the bar 20 and terminates in a tongue 46 having an opening suitable for pivoting about a pin 50. The said opening in the tongue 46 is adapted to permit the pin 50 to be positioned on a line perpendicular to the plane of the ends of the bars 18 and 20.

A second end of the rod 44 terminates in a tongue 52 provided with an opening suitable for pivoting about a pin 56. The said opening in the tongue 52 is adapted to permit the pin 56 to be held on a line lying in a plane parallel to the planes of the upper and lower sides 25 and 26 of the working end 14 and at right angles to the pin 50 held in the tongue 46 at the first end of the rod 44. The tongue 52 extends well into the elongated opening 32.

The rod 44 is connected to a reciprocating member or lifting bolt 58 through the tongue 52 by pivoted means which will be described below. The bolt 58 comprises an elongated body section 60 terminated on a first end in a tongue 62, and terminating on the second end in two laterally symmetrical bosses 64 and 66 disposed one on either side of the bolt 58. The elongated body 60 is adapted to fit into and move both axially and perpendicular to the longitudinal axis within the narrow portion 40 of the elongated opening 32; the tongue 62 extends well into the wider portion 38 of the elongated opening 32 and is provided with an opening 68 adapted for holding a pivot pin 70. In addition to the two end bosses 64 and 66 there are two bosses 72 and 74, one on either side of the elongated body 60 of the bolt 58 adjacent to the tongue 62. The end bosses 64 and 66 are wedge-shaped when viewed from the side of the bolt 58. Tapered surfaces 76 and 78 on the bosses 64 and 66 are adapted to contact and slide along the oblique surface 34 at the end of the elongated hollow member 10. The bosses 72 and 74 on the elongated body 60 of the bolt 58 are tapered so that their edges 80a and 80b are adapted to contact and slide along the oblique surfaces 39a and 39b. The action of the bosses 64 and 66 and 72 and 74 sliding along the oblique surfaces 34 and 39a and 39b is to constrain the bolt to motion parallel to the oblique surfaces 39a, 39b and 34; the motion of the bolt 58 thereby being confined within the elongated opening 32 and immediately adjacent thereto below the lower side of the working end 14 of the tool.

The tongue 62 of the bolt 58 and the tongue 52 of the rod 44 are pivotally connected by a double clevis 82 by means of pivot pins 70 and 56 respectively. Axial movement of the rod 44 with respect to the tube 16 loads the clevis 82, moving it axially with respect to the elongated opening 32 and in turn places an axial force on the bolt 58 whereupon the bolt 58 is caused to slide along the oblique surfaces 34 and 39a and 39b by reason of reaction with the edge surfaces of the bosses 64 and 66 and 72 and 74. When the axial movement of the rod, clevis, and bolt is, with respect to the elongated member 10 toward the control end 12 thereof, the bolt moves downward and the working end 14 of the elongated member is forced upward; when the axial movement of the rod, clevis, and bolt is, with respect to the elongated member 10, toward the working end 14, then the working end 14 moves downward and the elongated body 60 of the bolt 58 is drawn up within the opening 32 and a portion of the elongated body 60 protrudes into the recess 30 forcing whatever object may be hooked therein out of the recess.

Movement of the rod 44 with respect to the elongated member 10 is readily controlled by means of the lever arm 88 which pivots about the pin 90 on the fulcrum 22 and is connected at one end to the tongue 46 on the rod 44 by means of the pin 50. The arm 88 may be locked into one of two positions by placing a pin 92 through both an opening 94 in the locking bracket 24 and an opening provided in the handle portion of the lever arm 88. Fig. 1 shows the lever arm 88 locked in a position which forces the bolt 58 by the sequence of connections and means described above into a position wherein the recess 30 is disengaged from all objects. To hold an object in the recess 30 once it is engaged therein, the lever 88 would be positioned beneath and then pinned through opening 96 on the locking bracket 24.

My retrieving tool is adapted to use in seizing and moving a wide variety of objects provided these objects have contours suitable for hooking or locking into the recess 30. A sample container particularly suitable for use in neutronic reactors having horizontal tubes wherein the sample container must be positioned, and from which it must be retrieved is illustrated in fragmentary views in Figs. 2, 3, and 4. Only the end portion of the sample container 100 is shown. It is rectangular in cross section; it may be formed of metal or plastic sheets 102a, b, c and d, joined along their edges 104a, b, c, and d, open at the end, and provided with a pin or cylindrical bar 106 mounted midway between the top and bottom of the container and at right angles to the longitudinal axis of the tube through which the container must be moved. The bar 106 is mounted a distance from the end of the sample container 100.

In order to engage the tool with the sample container 100, the tool is slid along the tube or surface on which the sample container is positioned until the working end 14 of the tool contacts the container 100 and is extended into the end thereof. The longitudinal recess forming the shoulder 29 on the lower side of the working end 14 permits the working end 14 to pass through the open end of the sample container 100 between the lower sheet 102c and the bar 106. The recess 30 is positioned immediately below the bar 106 when the shoulders 27, 28 and 29 are in contact with the end edges of the sample container sheets 102a, b and d. The recess 30 may now be raised to engage the bar 106 by manipulating the lever arm 88 and in response thereto the rod 44, clevis 82 and bolt 58, so that the bolt 58 is forced downward and protrudes below the elongated opening 32 by the inner action of the oblique surfaces on the working end and the edges of the tapered bosses 64 and 66 and 72 and 74. Once the bar 106 is engaged in the recess 30 and the bolt 58 is forced firmly downward against the lower sheet 102d of the sample container, the sample container is positively gripped by the tool. The tool may now be locked in position to hold the container by positioning the lever arm 88 under the locking bracket hole 94 and passing the pin 92 through the hole 94 and an opening provided in the lever arm 88. With the container securely locked on to the working end 14 of the tool, the container may be moved by moving the entire tool. The embodiment of my retrieving tool shown in the drawings is normally moved by two operators although embodiments adapted for use by a single operator are readily constructed and are practical. The operators grip the bars 18 and 20, one on either side of the tool, facing toward each other, and move the entire tool and sample container. After repositioning the sample container as desired, the tool is disengaged therefrom by manipulating the lever arm 88 to effect retraction of the bolt 58 back into the elongated opening 32, therewith lowering the working end 14 and the recess 30 to a position below the bar 106, and thrusting a portion of the bolt's elongated body 60 up into the recess 30, forcing out any object retained in the recess 30.

The embodiment of my remote retrieving tool illustrated in the drawings and described above is adapted to pass through a tube one inch in diameter and as long as sixteen feet, from which an object at the remote end of the tube may be retrieved.

The foregoing specification and accompanying drawings are merely illustrative; the scope of my invention is intended to be limited only by the following claims.

What is claimed is:

1. A remote retrieving tool comprising an elongated member having a hollow interior, a working end, a control end, an upper surface, and an under surface, the said working end having an oblique under surface and a deep lateral traverse recess on the upper side opening into the hollow interior, a rod movably mounted within the member, a reciprocating member having wedge-shaped bosses on either side and an elongated body connected through pivoted means to the rod and positioned at the working end of the hollow member with the wedge-shaped bosses engaging the oblique under surface of the hollow member and the elongated body extending into and contained within the hollow member, whereby upon movement of the rod axially with respect to the hollow member an object may be engaged by the traverse recess when the said elongated body portion of the reciprocating member is depressed to a position below the recess by the inner action of the wedge-shaped bosses with the oblique surface, and the object may be disengaged from the recess when the elongated body is caused to project into the recess by the inner action of the wedge-shaped bosses with the oblique surface.

2. An apparatus for remotely engaging, moving, and disengaging an object comprising an elongated hollow member having a control end, a working end, an upper surface, a lower surface, a deep traverse recess on the upper surface of the working end, an oblique under surface at the working end and longitudinal openings in the upper and lower surfaces extending from the traverse recess toward the control end, a movably mounted rod disposed within the hollow member and extending beyond the control end thereof, a reciprocating member having at one end an elongated body portion and having wedge-shaped bosses on either side at the other end thereof, the elongated body portion being disposed within the hollow member and the wedge-shaped bosses adjacent the oblique lower surface, the rod being pivotally connected to the elongated body of the reciprocating member whereby an object may be engaged by the traverse recess when the reciprocating member is retracted by movement of the rod axially with respect to the hollow member in a direction toward the control end thereof causing the wedge bosses to move along the oblique under surface at the working end of the hollow member, raising the working end, causing the recess therein to engage the object, and withdrawing the elongated body portion of the reciprocating member from the recess, wherewith the object may be moved by bodily moving the apparatus while engaging the object and the object may be disengaged by moving the rod axially with respect to the hollow member in a direction toward the working end thereof, forcing the elongated body of the reciprocating member into the recess disengaging the object therefrom.

3. An apparatus for remotely engaging, moving, and disengaging an object having a horizontal pin mounted a distance from the lowermost part thereof, comprising a hollow elongated member having a tapered portion at a first end, an olique lower surface at the said first end, a deep recess on the upper surface at a distance from the said first end and longitudinal openings in the upper and lower surfaces thereof, a bolt comprising an elongated body and two tapered bosses disposed one on either side of the elongated body and at one end thereof, the elongated body being positioned within the hollow of the elongated member and the tapered bosses adjacent and engaging the oblique under surface of the hollow member, and means for moving the bolt longitudinally within the hollow member whereby the hollow member is raised and engages the horizontal pin by the action of the tapered bosses on the oblique under surface of the hollow member, the elongated body of the bolt being forced through the lower longitudinal opening by action of the tapered bosses on the oblique under surface of the hollow member, raising the first end thereby positioning the traverse recess for engagement with the horizontal pin, moving the object by moving the apparatus, then disengaging the object by lowering the hollow member and therewith the recess to a position below the pin by movement of the bolt and retraction thereof into the hollow member.

4. An apparatus for remotely engaging, moving, and disengaging an object having at one end a hollow interior and a bar having ends mounted with one end in either side, and disposed to span the hollow interior in spaced relation to said one end, the apparatus comprising an elogated hollow member having a working end and a control end, a rod positioned within the hollow member and disposed to move axially thereof, the working end of the hollow member being provided with a deep lateral recess on the upper surface thereof and an elongated opening along the lower surface thereof, a bolt positioned within the elongated opening pivotally connected to the rod and provided with means responsive to axial movement of the rod for moving the bolt downward through the elongated opening in the elongated hollow member therewith causing the working end of the elongated hollow member to rise until the bar is firmly seated in the lateral recess and the bolt is held firmly against the object whereby the object being thus seized by the retrieving tool may be repositioned by movement of the tool and then released in response to axial movement of the rod with respect to the hollow member thereby retracting the bolt from its protruding position and lowering the working end and the recess therein to a position below the bar.

5. An apparatus for remotely engaging, moving, and disengaging an object having at one end a hollow interior and a bar spanning the hollow interior in spaced relation to said one end, the apparatus comprising an elongated hollow member having a working end, a control end and upper and lower surfaces, a rod positioned in the elongated hollow member disposed to move axially with respect thereto, there being a deep lateral recess on the upper surface in the working end of the elongated member and an elongated opening the working end of the elongated hollow member disposed on the lower surface opposite the recess, means normally positioned within the elongated opening of the working end pivotally connected to the rod and adapted in response to axial movement to the rod to extension through the elongated opening to a position below the lower surface of the working end whereby the working end may be raised and the cylindrical bar of the object may be positioned in the lateral recess, the means being extended to firmly hold the working end of the tool between the bar and the bottom of the object wherewith the object may be moved and disengaged by retracting the means within the elongated opening and lowering the working end and therewith the recess to a point below the lateral bar of the object.

References Cited in the file of this patent

UNITED STATES PATENTS

| | | |
|---|---|---|
| 579,333 | Smith | Mar. 23, 1897 |
| 872,748 | Putney | Dec. 3, 1907 |